United States Patent
Wu et al.

(10) Patent No.: US 9,992,116 B2
(45) Date of Patent: Jun. 5, 2018

(54) METHOD AND DEVICE FOR PROCESSING PACKET CONGESTION

(71) Applicant: ZTE Corporation, Shenzhen (CN)

(72) Inventors: Liqun Wu, Shenzhen (CN); Zhizhong Wang, Shenzhen (CN); Hengqi Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 273 days.

(21) Appl. No.: 14/422,176

(22) PCT Filed: Aug. 5, 2013

(86) PCT No.: PCT/CN2013/080824
§ 371 (c)(1),
(2) Date: Feb. 17, 2015

(87) PCT Pub. No.: WO2014/026554
PCT Pub. Date: Feb. 20, 2014

(65) Prior Publication Data
US 2015/0244622 A1  Aug. 27, 2015

(30) Foreign Application Priority Data
Aug. 16, 2012 (CN) .......................... 2012 1 0292183

(51) Int. Cl.
*H04L 12/801* (2013.01)
*H04L 12/835* (2013.01)
(Continued)

(52) U.S. Cl.
CPC .............. *H04L 47/11* (2013.01); *H04L 47/12* (2013.01); *H04L 47/30* (2013.01); *H04L 47/32* (2013.01); *H04L 47/623* (2013.01); *H04L 47/326* (2013.01)

(58) Field of Classification Search
CPC ......... H04L 47/11; H04L 47/12; H04L 47/30; H04L 47/32; H04L 47/326; H04L 47/623
See application file for complete search history.

(56) References Cited

U.S. PATENT DOCUMENTS 5,764,641 A * 6/1998 Lin ..................... H04Q 11/0478
370/412
6,888,824 B1 * 5/2005 Fang ..................... H04L 49/103
370/359

(Continued)

FOREIGN PATENT DOCUMENTS

JP        H11298490 A    10/1999

OTHER PUBLICATIONS

International Search Report dated Nov. 21, 2013 re: Application No. PCT/CN2013/080824.

(Continued)

*Primary Examiner* — Habte Mered
(74) *Attorney, Agent, or Firm* — Cantor Colburn LLP

(57) ABSTRACT

Provided are a method and device for processing packet congestion. The method includes: receiving a packet fragment of a packet and fragment parameters and acquiring congestion parameters required for processing packet congestion according to the fragment parameters; when the packet fragment is an SOP fragment in the packet, acquiring an average queue size and a size threshold of the packet according to the fragment parameters and the congestion parameters and processing the packet. By acquiring the average queue size and the size threshold of the packet according to the fragment parameters and congestion parameters received and processing the packet according to the relationship between the average queue size and the size thresholds when a packet fragment received is an SOP fragment, the solution effectively eliminate the packet con- (Continued)

gestion in a communication network, accelerate the operation speed of processing the packet congestion and greatly save an internal cache space.

16 Claims, 9 Drawing Sheets

(51) Int. Cl.
*H04L 12/863* (2013.01)
*H04L 12/823* (2013.01)

(56) References Cited

U.S. PATENT DOCUMENTS

| | | | | |
|---|---|---|---|---|
| 6,980,516 | B1* | 12/2005 | Wibowo | H04L 47/10 370/235 |
| 6,996,062 | B1* | 2/2006 | Freed | H04L 45/30 370/235 |
| 7,245,586 | B2* | 7/2007 | Bitar | H04L 12/5693 370/235 |
| 2003/0112814 | A1* | 6/2003 | Modali | H04L 47/10 370/412 |
| 2004/0100900 | A1* | 5/2004 | Lines | G06F 13/4247 370/229 |
| 2007/0070907 | A1 | 3/2007 | Kumar et al. | |
| 2007/0104102 | A1* | 5/2007 | Opsasnick | H04L 47/10 370/230 |
| 2007/0104211 | A1* | 5/2007 | Opsasnick | H04L 45/7453 370/412 |
| 2011/0085464 | A1* | 4/2011 | Nordmark | H04L 49/101 370/252 |

OTHER PUBLICATIONS

Written Opinion dated Nov. 21, 2013 re: Application No. PCT/CN2013/080824.
Supplemental European Search Report and Written Opnion Application No. EP13829109 dated Jul. 7, 2015; pp. 5.

* cited by examiner

METHOD AND DEVICE FOR PROCESSING PACKET CONGESTION

TECHNICAL FIELD

The disclosure relates to the communications field, and in particular to a method and device for processing packet congestion.

BACKGROUND

During the process of network communications, if the data traffic sent from users is not limited, then the continuous burst of data sent from a great many users will lead to network congestion. Immoderate congestion will cause a severe hazard to network resources and therefore must be removed. Congestion avoidance is a traffic control mechanism by means of which the usage of network resources can be monitored and a network overload can be eliminated by adjusting the traffic of the network, for example, by actively discarding packets in the case of network congestion. When discarding packets, a device maximizes the throughput and the utilization efficiency of a network and at the same time minimizes the number of the packets discarded and the delay of packet discarding by using an effective combination of a specific packet discarding policy and a remote traffic control mechanism.

In related art, packet congestion processing is carried out in a network processor mainly by using a Weighted Random Early Detection (WRED) algorithm. In this method, a discarding probability is mainly determined by comparing an average queue size with a set upper limit and lower limit of the average queue size, wherein the average queue size is the function of queue size which reflects the variation trend of a queue. When determining whether or not to discard a packet, the method first acquires the queue size of packets having the same queue number, calculates the average queue size using a corresponding algorithm, and then determines the discarding probability by comparing the average queue size with the set upper limit and set lower limit of the average queue size. High energy consumption and a relatively long waiting time are unavoidable when a packet discarding processing is carried out using this method which requires for the acquisition of the packet size of the current packet prior to the calculation of a queue size corresponding to the packet for the following reason: as the packet is transmitted to a network processor in the form of packet fragments, to obtain the size of the current packet, it is needed to store the packet fragments using a Random Access Memory (RAM) until the entire packet is received to acquire the size of the packet without which a congestion processing cannot be carried out. As network processors provide more and more interfaces, and the packet fragments at different interfaces are generally interwoven, RAM resource is consumed in proportion to the number of interfaces in this method. The consumption of RAM resource is unacceptable when the number of interfaces is beyond a certain range.

SUMMARY

The embodiments of the disclosure mainly provide a method and device for processing packet congestion, so as to efficiently solve the problem of packet congestion in the communication network.

The method for processing packet congestion of the disclosure includes the following steps:

receiving packet fragments of a packet and fragment parameters and acquiring congestion parameters required for processing packet congestion according to the fragment parameters; and when a packet fragment is a Start Of Packet SOP fragment in the packet, acquiring an average queue size and a size threshold of the packet according to the fragment parameters and the congestion parameters and processing the packet.

In an example embodiment, after acquiring the average queue size and the size threshold of the packet according to the fragment parameters and the congestion parameters, the method further includes:

correcting and updating the average queue size of the packet according to the difference between an actual size of the packet and a configured packet size contained in the fragment parameters when the an End Of Packet, EOP, fragment in the packet arrives.

In an example embodiment, acquiring the average queue size and the size threshold of the packet according to the fragment parameters and the congestion parameters and processing the packet includes:

acquiring the average queue size of the packet according to the fragment parameters and the congestion parameters, acquiring a WRED policy group according to a packet queue number contained in the fragment parameters and acquiring an upper size threshold and a lower size threshold of the average queue size according to queue priority and policy group parameters contained in the WRED policy group;

judging a relationship between the average queue size and the upper size threshold as well as a relationship between the average queue size and the lower size threshold;

permitting the discarding of the SOP fragment if the average queue size is greater than the upper size threshold;

permitting the passing of the SOP fragment if the average queue size is less than the lower size threshold;

randomly discarding the SOP fragment according to the WRED policy group if the average queue size is neither less than the lower size threshold nor greater than the upper size threshold, and permitting the passing or discarding of all packet fragments of the packet according to the result of the processing implemented on the SOP fragment.

In an example embodiment, the step of randomly discarding the SOP fragment according to the WRED policy group if the average queue size is neither less than the lower size threshold nor greater than the upper size threshold includes:

generating a random number and calculating and acquiring a discarding probability of the SOP fragment according to the WRED policy group;

judging whether or not the random number is less than the discarding probability;

permitting the discarding of the SOP fragment if the random number is less than the discarding probability; or permitting the passing of the SOP fragment if the random number is not less than the discarding probability.

In an example embodiment, after the step of correcting and updating the queue size of the packet according to the difference between the actual size of the packet and a configured packet size contained in the fragment parameters when the EOP fragment arrives, the method further includes:

discarding the packet permitted to be discarded or transmitting the packet permitted to be passed and the updated average queue size of the packet according to the result of the processing implemented on the packet.

The device of processing packet congestion of the disclosure, which includes:

a congestion input component configured to receive packet fragments of a packet and fragment parameters and acquire congestion parameters required for processing the packet congestion according to the fragment parameters; and a congestion processing component configured to acquire, when the packet fragment is a Start Of Packet, SOP, fragment in the packet, the average queue size and a size threshold of the packet according to the fragment parameters and the congestion parameters and process the packet.

In an example embodiment, the congestion processing component is also configured to correct and update the average queue size of the packet according to the difference between the actual size of the packet and a configured packet size contained in the fragment parameters when an End Of Packet, EOP, fragment of the packet arrives.

In an example embodiment, the congestion processing component includes:

a parameter acquisition sub-component configured to:

acquire the average queue size of the packet according to the fragment parameters and the congestion parameters, acquire a WRED policy group according to a packet queue number contained in the fragment parameters and acquire an upper size threshold and a lower size threshold of the average queue size according to the queue priority and policy group parameters contained in the WRED policy group;

a packet judgment sub-component configured to:

judge a relationship between the average queue size and the upper size threshold as well as the relationship between the average queue size and the lower size threshold, permit the discarding of the SOP fragment if the average queue size is greater than the upper size threshold, permit the passing of the SOP fragment if the average queue size is less than the lower size threshold, randomly discard the SOP fragment according to the WRED policy group if the average queue size is neither less than the lower size threshold nor greater than the upper size threshold, and permit the passing or discarding all packet fragments of the packet according to the result of the processing implemented on the SOP fragment.

In an example embodiment, the packet judgement sub-component includes:

a size threshold judgment component configured to judge the relationship between the average queue size and the upper size threshold as well as the relationship between the average queue size and the lower size threshold;

a first result component configured to permit the discarding of the SOP fragment if the average queue size is greater than the upper size threshold;

a second result component configured to permit the passing of the SOP fragment if the average queue size is less than the lower size threshold;

a third result component configured to randomly discard the SOP fragment according to the WRED policy group if the average queue size is neither less than the lower size threshold nor greater than the upper size threshold, and a fourth result component configured to permit the passing or discarding of all packet fragments of the packet according to the result of the processing implemented on the SOP fragment.

The third result component includes:

a random parameter acquisition subcomponent configured to generate a random number and calculate and acquire the discarding probability of the SOP fragment according to the WRED policy group;

a random parameter comparison subcomponent configured to judge whether or not the random number is less than the discarding probability; and a result acquisition subcomponent configured to permit the discarding of the SOP fragment if the random number is less than the discarding probability or permit the passing of the SOP fragment if the random number is not less than the discarding probability.

In an example embodiment, the device for processing the packet congestion further includes:

a congestion output component configured to discard the packet permitted to be discarded or transmit the packet permitted to be passed and the updated average queue size of the packet according to the result of the processing implemented on the packet.

In the embodiments of the disclosure, congestion parameters required for processing the packet congestion are acquired according to the packet fragments and fragment parameters received and, when the packet fragment is the SOP fragment, the average queue size and the size threshold of the packet are acquired according to the fragment parameters and the congestion parameters and then the packet is processed. This solution can effectively eliminate the packet congestion in the communication network, accelerate operation speed for processing the packet congestion and greatly save an internal cache space.

The achievement of the object, the functional features and the advantages of the disclosure and are described below with reference to accompanying drawings when read in conjunction with embodiments.

DETAILED DESCRIPTION OF EMBODIMENTS

The technical solution of the disclosure will be described hereinafter in detail with reference to the drawings and in conjunction with embodiments. It should be appreciated that the embodiments described herein are merely illustrative of the disclosure but not to be construed as limiting the disclosure.

Figure 1:
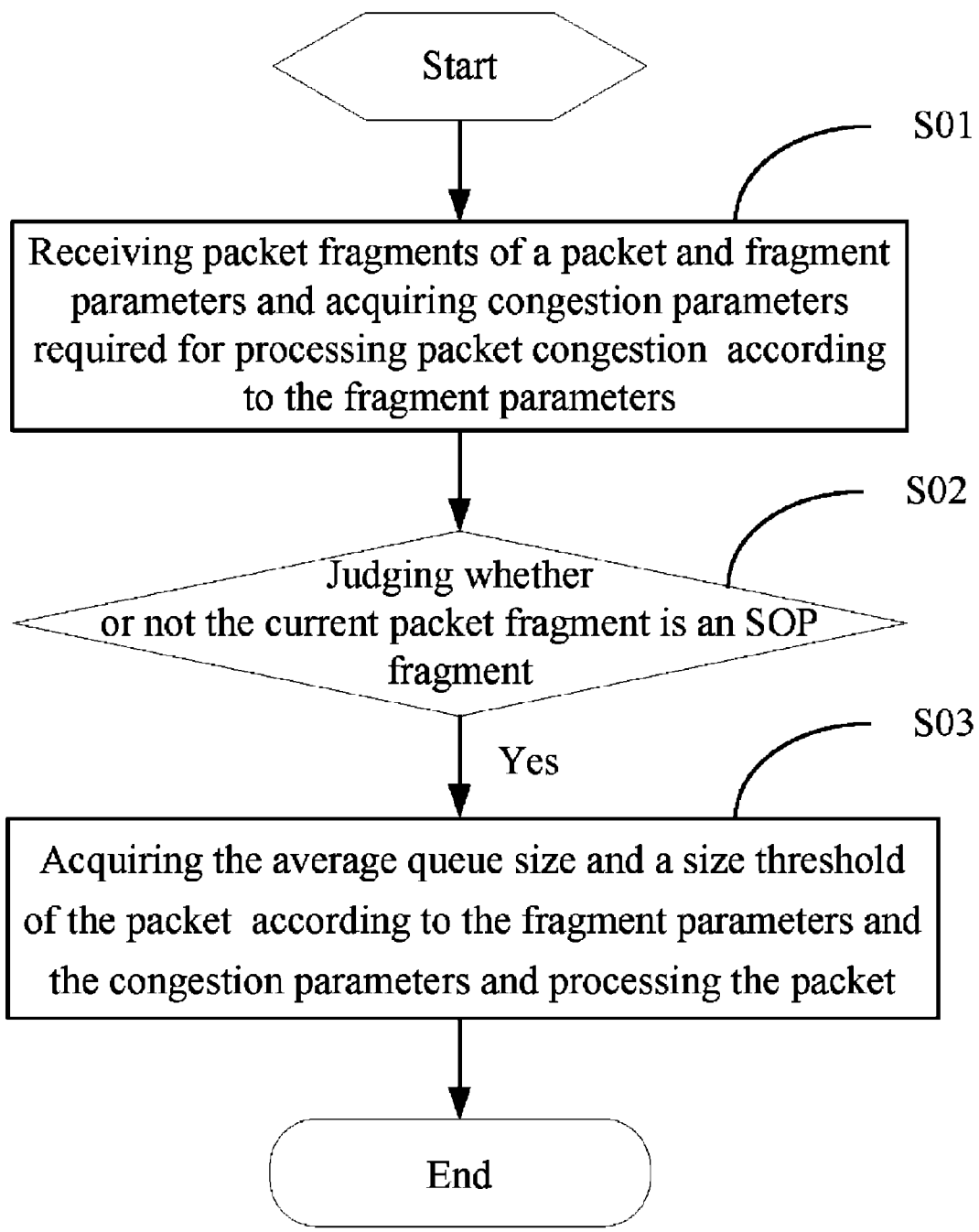
FIG. 1 is a schematic diagram showing the flow of a method for processing the packet congestion according to the first embodiment of the disclosure.

Refer to FIG. 1, which is a schematic diagram showing the flow of a method for processing the packet congestion according to the first embodiment of the disclosure, As shown in FIG. 1 the method for processing the packet congestion includes the following steps:

Step S01: receiving packet fragments of a packet and fragment parameters and acquiring congestion parameters required for processing packet congestion according to the fragment parameters;

in an example embodiment, a packet and packet fragments sent from an upper-level related component are received, wherein the packet fragments include a SOP fragment of the packet fragments, an EOP fragment of the packet fragments and other effective packet fragments, and related fragment parameters include a packet valid signal, a configured packet size and so on; an actual size of the packet is acquired based on the interval between the time slots of the SOP fragment and the EOP fragment; meanwhile, parameters required for the current packet congestion processing, such as the upper size threshold of the average queue size of the average queue size, the lower size threshold of the average queue size, a queue calculation weight, an average queue size, the discarding slope of curve, are acquired from a corresponding internal RAM according to the packet valid signal; after the parameters required for the current packet congestion processing are read from the internal RAM, the actual size of the packet is calculated by the parameters, the configured packet size and counting all fragments of the packet, and then the actual size of the packet, the packet fragments, the packet valid signal, the configured packet size and the processed related fragment information are transmitted;

Step S02: judging whether or not the current packet fragment is the SOP fragment, and if so, executing Step S03;

Step S03: acquiring the average queue size and a size threshold of the packet according to the fragment parameters and the congestion parameters, and processing the packet;

in an example embodiment, whether or not the packet contains an SOP fragment is judged after the actual size of the packet, the packet fragments, the packet valid signal, the configured packet size and the processed related fragment information are received, and a queue size is calculated by the configured packet size if the packet contains the SOP fragment. After the queue size is determined, an average queue size corresponding to the current packet is calculated by the queue size, the queue calculation weight and the average queue size. Whether or not to discard the current packet is judged according to the average queue size corresponding to the current packet in combination with the upper size threshold of the average queue size and the lower size threshold of the average queue size. Specifically, if the average queue size is greater than the upper size threshold of the average queue size, then the packet will be discarded; if the average queue size is less than the lower size threshold of the average queue size, then the packet will be not discarded; and if the average queue size is neither greater than the upper size threshold of the average queue size nor less than the lower size threshold of the average queue size, then the packets received afterwards are discarded randomly. In an example embodiment, whether or not to discard a packet is judged by a WRED algorithm. That is, a discarding probability is calculated according to the WRED algorithm, the calculated discarding probability is compared with a generated random number, and the current packet is discarded if the generated random number is less than the discarding probability or not discarded if the generated random number is greater than the discarding probability. All packet fragments of the packet are passed or discarded according to the result of the processing implemented on the SOP fragment. The packet size used in the WRED calculation of the SOP fragment is a configured size, but not the actual size of the packet. If it is determined to discard the SOP fragment, then the subsequent fragments of the packet are all discarded according to judging result on the SOP fragment, and if it is determined to pass the SOP fragment, then the subsequent fragments of the packet are all passed according to judging result on the SOP fragment.

In the disclosure, by acquiring congestion parameters required for processing the packet congestion according to the packet fragments and fragment parameters received and, when the packet fragment is merely the SOP fragment, acquiring the average queue size and the size threshold of the packet according to the fragment parameters and the congestion parameters and then processing the packet, effectively eliminates the packet congestion in the communication network, accelerates operation speed for processing the packet congestion and greatly saves an internal cache space.

Figure 2:
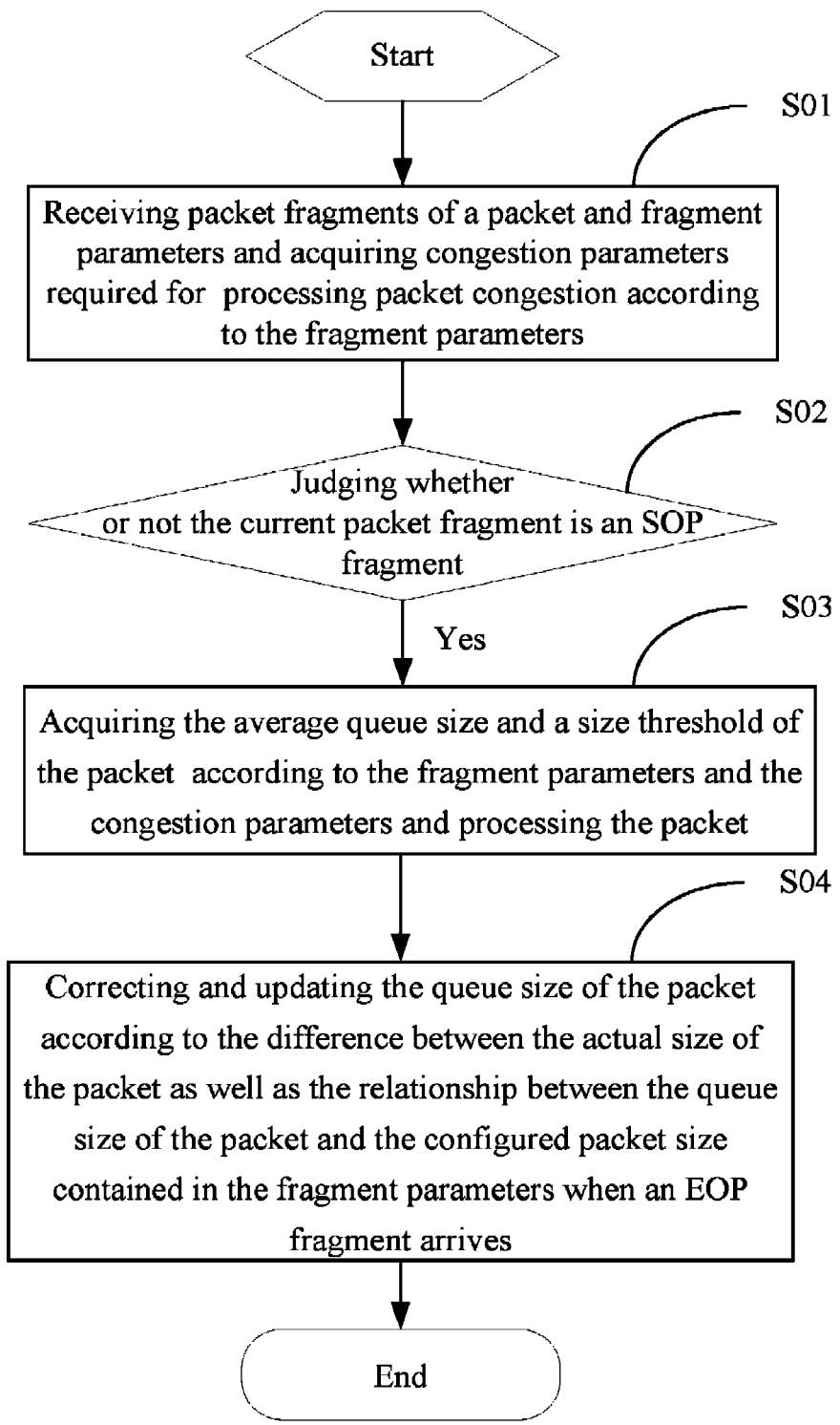
FIG. 2 is a schematic diagram showing the flow of a method for processing the packet congestion according to the second embodiment of the disclosure.

Refer to FIG. 2, which is a schematic diagram showing the flow of a method for processing the packet congestion according to the second embodiment of the disclosure, the second embodiment of the disclosure of the method for processing the packet congestion herein is different from the first embodiment of the disclosure of the method for processing the packet congestion processing herein in the addition of Step S04, in the second embodiment, only Step S04 is described in detail while the other Steps involved in the method for processing the packet congestion herein are understood with reference to related detailed description given in related embodiments and are therefore not described here repeatedly.

As shown in FIG. 2, the method for processing the packet congestion herein further includes, after Step S03 of acquiring the average queue size and the size threshold of the packet according to the fragment parameters and the congestion parameters and processing the packet, the following step:

Step S04: correcting and updating the average queue size of the packet according to the difference between the actual size of the packet and the configured packet size contained in the fragment parameters when the EOP fragment arrives.

In the second embodiment of the disclosure of the method for processing the packet congestion, if a packet fragment is both the SOP fragment and the EOP fragment, then the queue size of the current packet is corrected and updated using the difference between the actual size of the packet size and the configured packet size, wherein the actual size of the packet is acquired based on the interval between the time slots of the EOP fragment and the SOP fragment. After the actual size of the packet is determined, an average queue size corresponding to the current packet is calculated according to the actual size of the packet, the queue calculation weight and the average queue size of packet fragments; if the packet fragment is merely the SOP fragment, then the following calculation is carried out using the configured packet size; whether or not to discard a SOP packet is judged when the SOP packet is fragmented, and the queue size is corrected when an EOP fragment is received.

In the second embodiment, by correcting and updating the queue size of a packet according to the difference between the actual size of the packet and a configured packet size contained in fragment parameters when the EOP fragment arrives, this method accelerates operation speed for processing the SOP fragment congestion.

Figure 3:
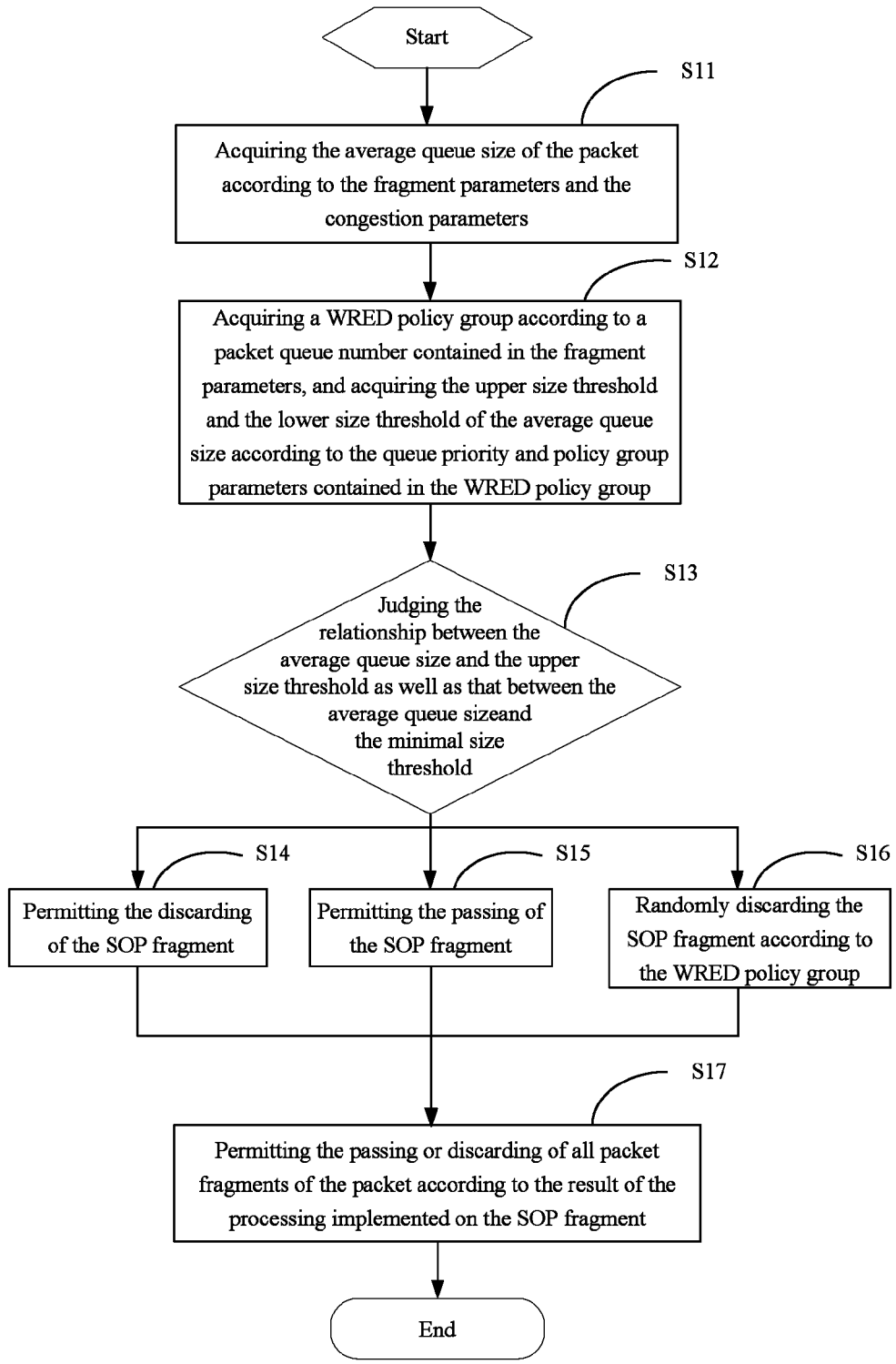
FIG. 3 is a schematic diagram showing the flow of acquiring the average queue size of a packet according to fragment parameters and congestion parameters and processing the packet in a method for processing the packet congestion according to an embodiment of the disclosure.

Refer to FIG. 3, which is a schematic diagram showing the flow of acquiring the average queue size of a packet according to fragment parameters and congestion parameters and processing the packet contained in a method for processing the packet congestion according to an embodiment of the disclosure; herein, in the embodiment, only Step S03 is described in detail while the other Steps involved in the method for processing the packet congestion herein are understood with reference to related detailed description given in related embodiments and are therefore not described here repeatedly.

Figure 4:
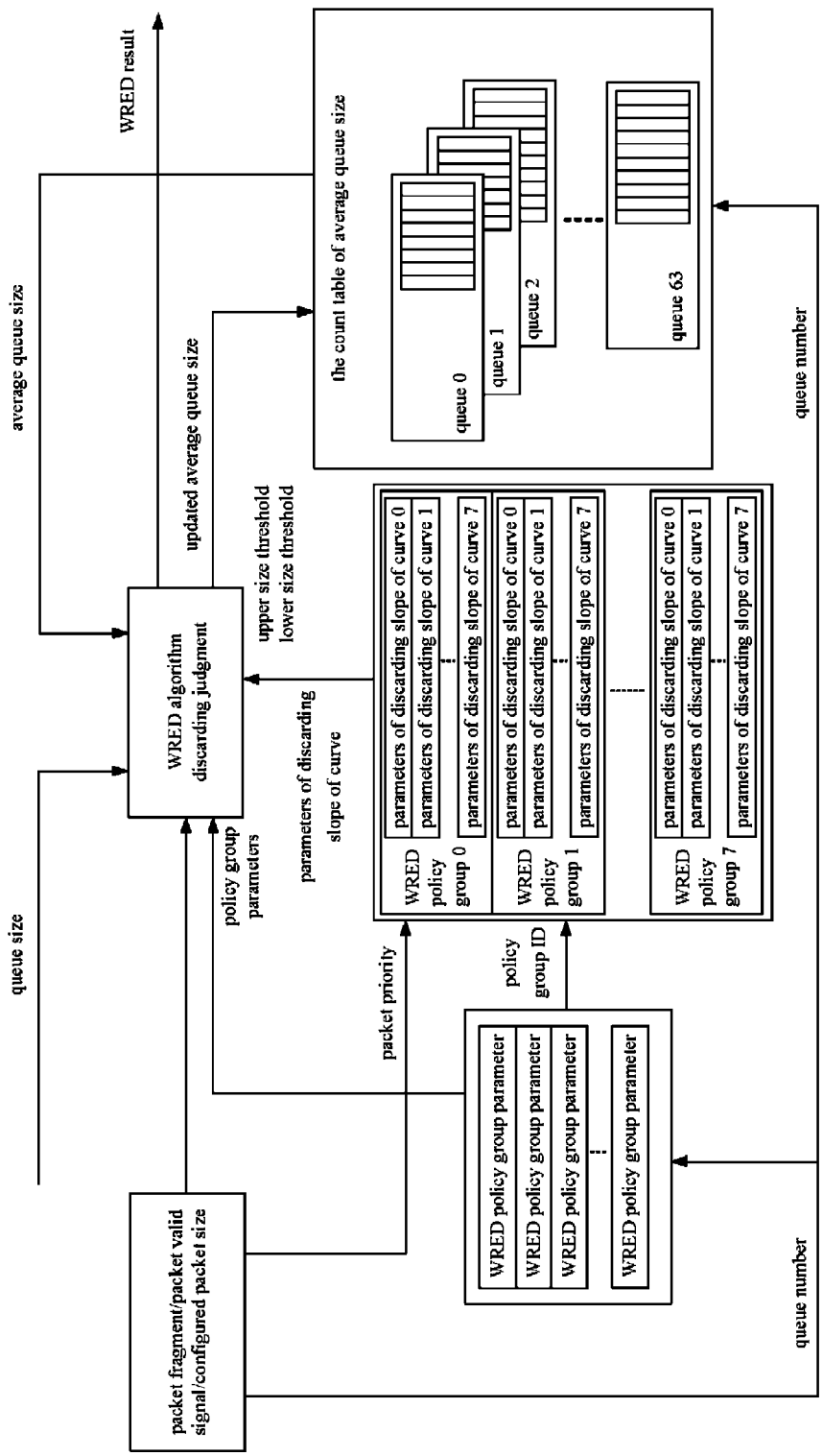
FIG. 4 is a schematic diagram showing the operating principle of WRED used in the method for processing the packet congestion according to an embodiment of the disclosure.

As shown in FIG. 3, in the disclosure of method for processing the packet congestion herein, Step S303 of acquiring the average queue size and the size threshold of the packet according to the fragment parameters and the congestion parameters and processing the packet specifically includes:

Step S11: acquiring the average queue size of the packet according to the fragment parameters and the congestion parameters;

a queue size is calculated using the configured packet size if the packet fragment is merely the SOP fragment, and then an average queue size corresponding to the current packet is calculated according to the queue size, the queue calculation weight and the average queue size of the packet fragment;

Step S12: acquiring a WRED policy group according to a packet queue number contained in the fragment parameters, and acquiring the upper size threshold and the lower size threshold of the average queue size according to the queue priority and policy group parameters contained in the WRED policy group;

In an example embodiment, processing the packet congestion is carried out by a WRED algorithm. Refer to FIG. 4, which is a schematic diagram showing the operating principle of WRED used in the method for processing the packet congestion according to an embodiment of the disclosure herein, the WRED policy group is acquired according to a packet queue number received, policy group parameters are acquired according to the policy group, the policy group parameters comprising: the queue calculation weight and queue size threshold; parameters required for processing the current packet congestion, such as the upper size threshold of the average queue size, the lower size threshold of the average queue size and the discharging slope of curve, are acquired from a corresponding internal RAM according to the WRED policy group and a packet priority;

Step S13: judging the relationship between the average queue size and the upper size threshold as well as the relationship between the average queue size and the lower size threshold, executing Step S14 if the average queue size is greater than the upper size threshold, executing Step S15 if the average queue size is less than the lower size threshold, and executing Step S16 if the average queue size is neither less than the lower size threshold nor greater than the upper size threshold;

Step S14: permitting the discarding of the SOP fragment;

Step S15: permitting the passing of the SOP fragment;

Step S16: randomly discarding the SOP fragment according to the WRED policy group;

the relationship between the average queue size and the upper size threshold as well as the relationship between the average queue size and the lower size threshold is judged, the SOP fragment is permitted to be discarded if the average queue size is greater than the upper size threshold, permitted to be passed if the average queue size is less than the lower size threshold, or randomly discarded according to the WRED policy group if the average queue size is neither less than the lower size threshold nor greater than the upper size threshold.

In an example embodiment, randomly discarding the SOP fragment according to the WRED policy group specifically includes: generating a random number, and calculating and acquiring the discarding probability of the SOP fragment according to the WRED policy group; and permitting the discarding of the SOP fragment if the random number is less than the discarding probability or permitting the passing of the SOP fragment if the random number is not less than the discarding probability; and Step S17: permitting the passing or discarding of all packet fragments of the packet according to the result of the processing implemented on the SOP fragment.

All the packet fragments in the packet are processed according to the result of the processing implemented on the SOP fragment: the subsequent fragments of the packet are all discarded if it is judged to discard the SOP fragment or all passed if it is judged to pass the SOP fragment.

In the embodiment, by acquiring the average queue size of the SOP fragment according to fragment parameters and congestion parameters and processing a packet according to the average queue size, effectively eliminates the packet congestion in the communication network and saves the internal cache space.

Figure 5:
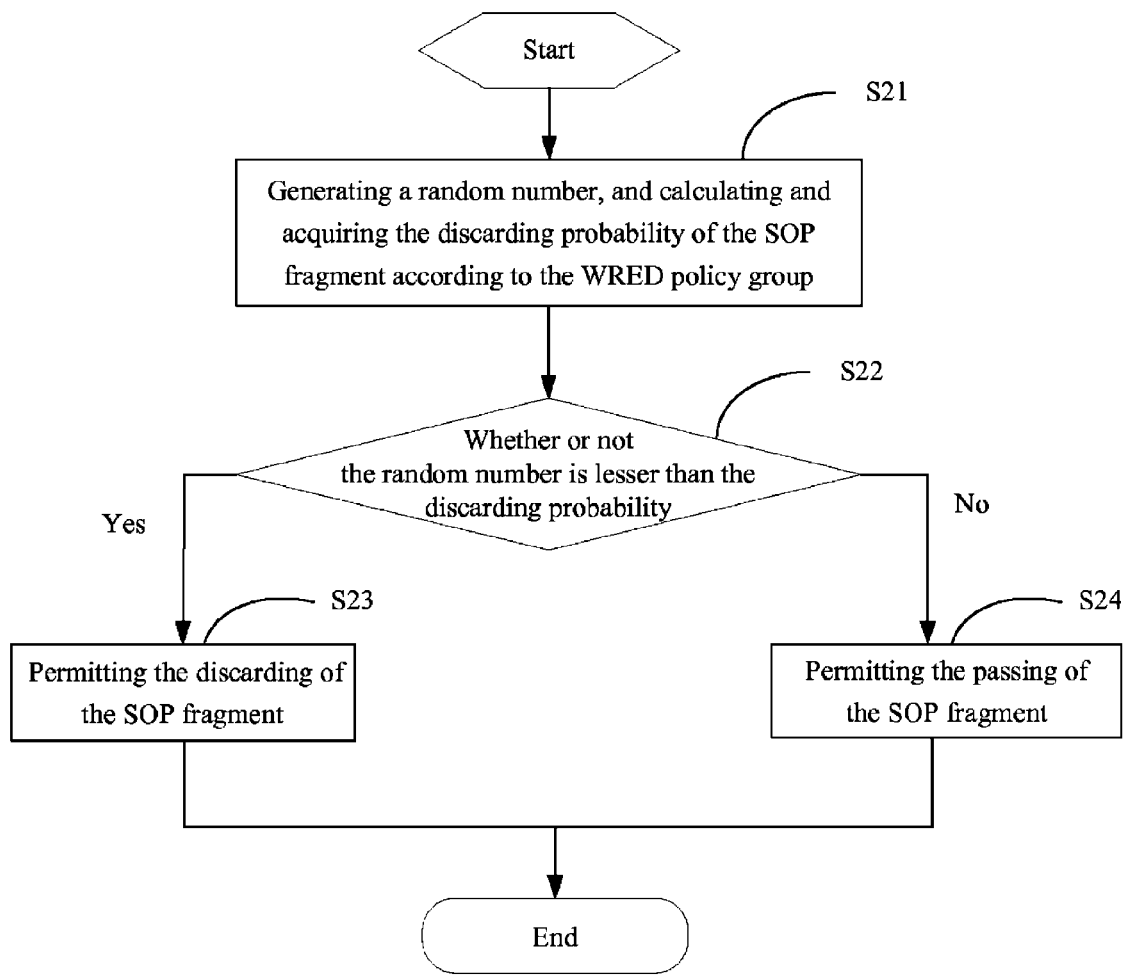
FIG. 5 is schematic diagram showing the flow of randomly discarding an SOP fragment according to the WRED policy group if the average queue size of a packet is neither less than a lower size threshold nor greater than a upper size threshold involved in the method for processing the packet congestion according to an embodiment of the disclosure.

Refer to FIG. 5, which is schematic diagram showing the flow of randomly discarding an SOP fragment according to the WRED policy group if the average queue size of a packet is neither less than a lower size threshold nor greater than a upper size threshold involved in the method for processing the packet congestion according to an embodiment of the disclosure herein, in the embodiment, only the above situations is further described while the other steps included in the method for processing the packet congestion herein are understood with reference to related detailed description given in related embodiments and are therefore described here repeatedly.

As shown in FIG. 5, in the method for the packet congestion processing herein, the step of randomly discarding an SOP fragment according to the WRED policy group if the average queue size of a packet is neither less than a lower size threshold nor greater than a upper size threshold specifically includes:

Step S21: generating a random number, and calculating and acquiring the discarding probability of the SOP fragment according to the WRED policy group;

a random number R is generated before the SOP fragment is randomly discarded, and a discarding probability Pb is calculated according to the WRED algorithm which can be understood with reference to the detailed description given in the embodiment shown in FIG. 4 and is therefore not described here repeatedly;

Step S22: judging whether or not the random number is less than the discarding probability, if so, executing Step S23, otherwise, executing Step S24;

Step S23: permitting the discarding of the SOP fragment;

Step S24: permitting the passing of the SOP fragment;

the SOP fragment is randomly discarded by performing an arbitration judgment on the random number R and the discarding probability Pb, specifically, it is judged to discard the SOP fragment if the random number R being less than the discarding probability Pb is met; and it is judged not to discard the SOP fragment if the random number R being less than the discarding probability Pb is not met. The packet is discarded if the SOP fragment is discarded or not discarded if the SOP fragment is not discarded.

In the embodiment, generating a random number, calculating and acquiring a discarding probability according to the WRED policy group and randomly discarding a packet according to the relationship between the random number and the discarding probability, the method further improves a congestion processing efficiency.

Figure 6:
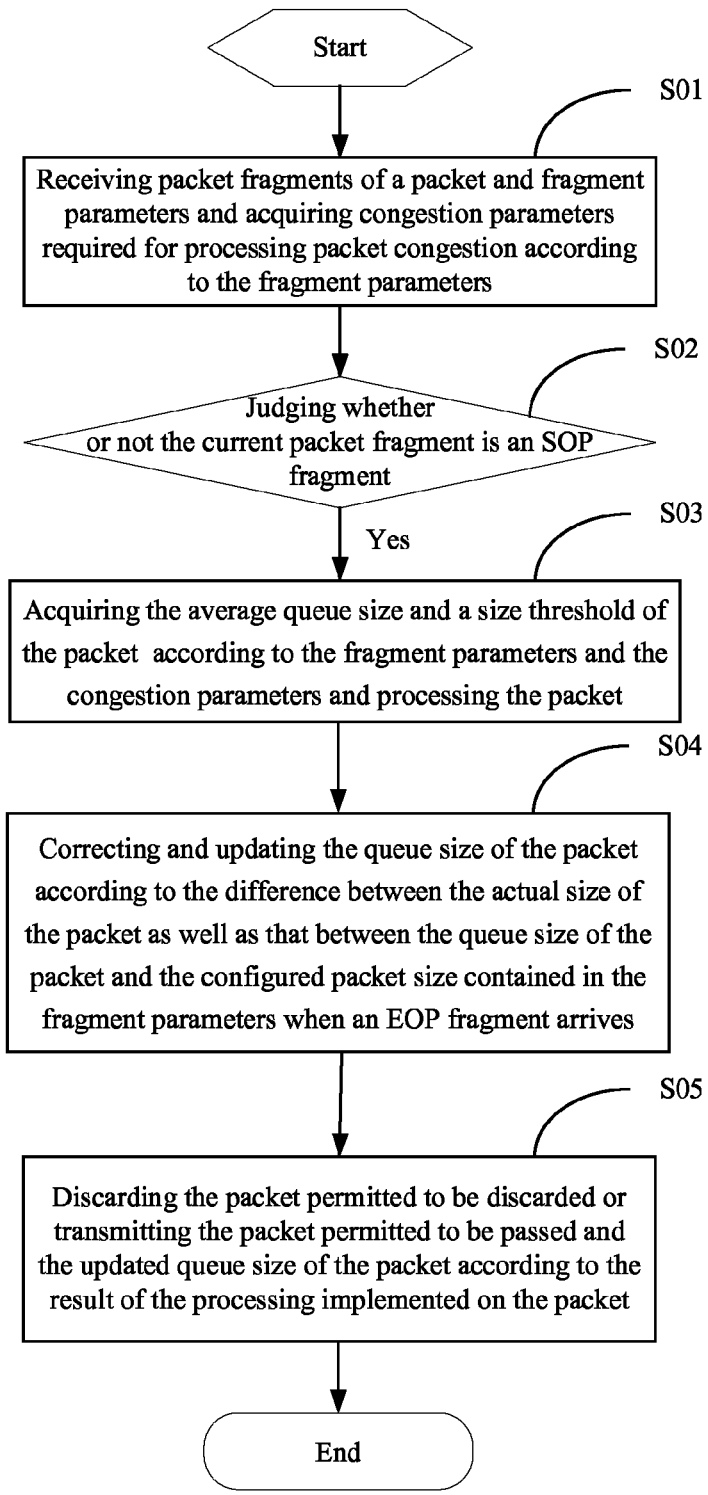
FIG. 6 is a schematic diagram showing the flow of a method for processing the packet congestion according to the third embodiment of the disclosure.

Refer to FIG. 6, which is a schematic diagram showing the flow of a method for processing the packet congestion according to the third embodiment of the disclosure herein, the third embodiment of the method for processing the packet congestion herein is different from the second embodiment of the method for processing the packet congestion herein in the addition of Step S05, in the third embodiment, only Step S05 is described in detail while the other Steps included in the method for processing the packet congestion herein are understood with reference to related detailed description given in related embodiments and are therefore not described here repeatedly.

As shown in FIG. 6, the method for processing the packet congestion in the disclosure herein further includes, after Step S04 of correcting and updating the average queue size of the packet according to the difference between the actual size of the packet and the configured packet size contained in the fragment parameters when the EOP fragment arrives, the following step:

Step S05: discarding the packet permitted to be discarded or transmitting the packet permitted to be passed and the updated queue size of the packet according to the result of the processing implemented on the packet.

According to the result of the processing on whether or not to discard the packet, the updated average queue size of the packet is transmitted to a related component, which is configured to update the average queue size stored in the RAM, in the meantime directly discard a packet needing discarding and send a normal packet to a lower-level component to be processed by the lower-level component.

In the third embodiment, the method for processing a packet according to a packet processing result and transmitting the updated average queue size of the packet, further accelerates the operation speed of processing the packet congestion and saves the internal cache space.

Figure 7:
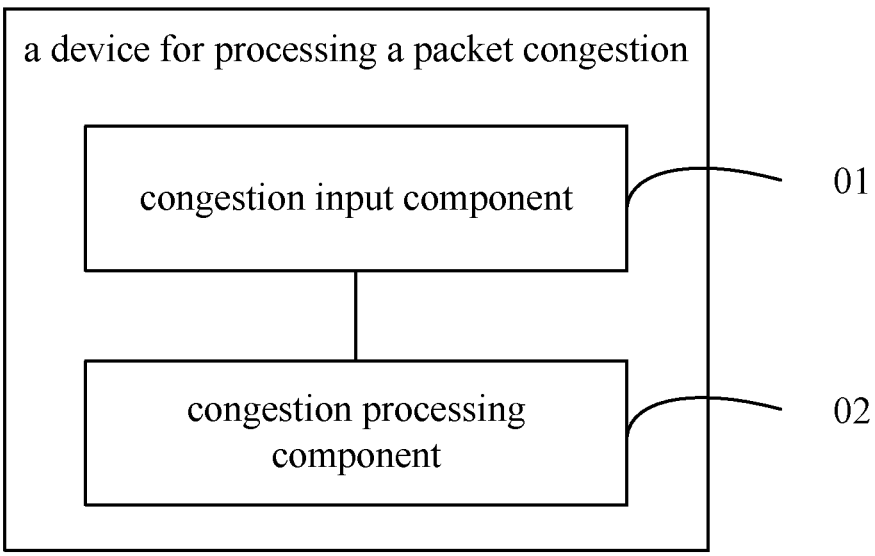
FIG. 7 is a structural diagram of a device for processing the packet congestion according to the first embodiment of the disclosure.

Refer to FIG. 7, which is a structural diagram of a device for processing the packet congestion according to the first embodiment of the disclosure; as shown in FIG. 7, the device for processing the packet congestion includes:

a congestion input component 01 is configured to receive packet fragments of a packet and fragment parameters and acquire congestion parameters required for processing the packet congestion according to the fragment parameters;

in an example embodiment, the congestion input component 01 receives a packet and a packet fragments from an upper-level related component, wherein the packet fragments include: an SOP fragment, an EOP fragment and other effective packet fragments, and the related fragment parameters include a packet valid signal, a configured packet size and so on; the actual size of the packet is acquired based on the interval between the time slots of the SOP fragment and the EOP fragment; meanwhile, the congestion input component 01 acquires parameters required for the current packet congestion processing, such as the upper size threshold of the average queue size, the lower size threshold of the average queue size, a queue calculation weight, an average queue size, the discharging slope of curve, are acquired from a corresponding internal RAM according to the packet valid signal; after reading the parameters required for processing the current packet congestion from the internal RAM, the congestion input component 01 calculates the actual size of the packet by the parameters, the configured packet size and counting all fragments of the packet, and then sends the actual size of the packet, the packet fragments, the packet valid signal, the configured packet size and the processed related fragment information to a congestion processing component 02;

the congestion processing component 02 is configured to acquire the average queue size and the size threshold of the packet according to the fragment parameters and the congestion parameters, when a packet fragment is an SOP fragment, and process the packet;

the congestion processing component 02 is also configured to correct and update the average queue size of the packet according to the difference between the actual size of the packet and the configured packet size contained in the fragment parameters when the EOP fragment arrives.

in an example embodiment, after receiving the actual size of the packet, the packet fragments, the packet valid signal, the configured packet size and the processed fragmented information, the congestion processing component 02 judges whether or not the packet contains the SOP fragment and if so, calculates a queue size by the configured packet size; after determining the queue size, the congestion processing component 02 calculates an average queue size corresponding to the current packet according to the queue size, the queue calculation weight and the average queue size. After acquiring the average queue size corresponding to the current packet, the congestion processing component 02 judges whether or not to discard the current packet according to the average queue size in combination with the upper size threshold of the average queue size and the lower size threshold of the average queue size. Specifically, if the average queue size is greater than the upper size threshold of the average queue size, then the congestion processing component 02 permits the current packet to be discarded; if the average queue size is less than the lower size threshold of the average queue size, then the congestion processing component 02 permits the packet not to be discard; and if the average queue size is neither greater than the upper size threshold of the average queue size nor less than the lower size threshold of the average queue size, then the congestion processing component 02 starts to randomly discard the packets received afterwards. In an example embodiment, the congestion processing component 02 judges whether or not to discard the current packet by a WRED algorithm. That is, the congestion processing component 02 calculates a discarding probability according to the WRED algorithm, compares the calculated discarding probability with a generated random number, permits the current packet to be discarded if the generated random number is less than the discarding probability or permits the current packet not to be discarded if the generated random number is greater than the discarding probability. All packet fragments of the packet are passed or discarded according to the result of the processing implemented on the SOP fragment. The packet size used in the WRED calculation of the SOP fragment is the configured size, but not the actual size of the packet. If it is judged to discard the SOP fragment, then the subsequent fragments of the packet are all discarded according to the result of the determination on the SOP fragment, and if it is judged to pass the SOP fragment, then the subsequent fragments of the packet are all passed according to the result of the determination on the SOP fragment.

In the embodiment of method for processing the packet congestion, if a packet fragment is both the SOP fragment and the EOP fragment, then the congestion processing component 02 corrects and updates the queue size of the current packet by the difference between the actual size of the packet and the configured packet size, wherein the actual size of the packet is acquired based on the interval between the time slots of the EOP fragment and the SOP fragment. After determining the actual size of the packet, the congestion processing component 02 calculates an average queue size corresponding to the current pack according to the actual size of the packet, a queue calculation weight and the average queue size of packet fragments; if the packet fragment is merely the SOP fragment, then the congestion processing component 02 carries out the following calculation by the configured packet size; and the congestion processing component 02 judges whether or not to discard a packet when the SOP packet is fragmented and corrects the queue size when the EOP fragment is received.

In the disclosure, by acquiring congestion parameters required for processing the packet congestion according to the packet fragments and fragment parameters received and, when the packet fragment is merely the SOP fragment, acquiring the average queue size and the size threshold of the packet according to related parameters and then processing the packet according to the average queue size and the size threshold, effectively eliminates the packet congestion in the communication network, accelerates the operation speed of processing the packet congestion and greatly saves an internal cache space.

Figure 8:
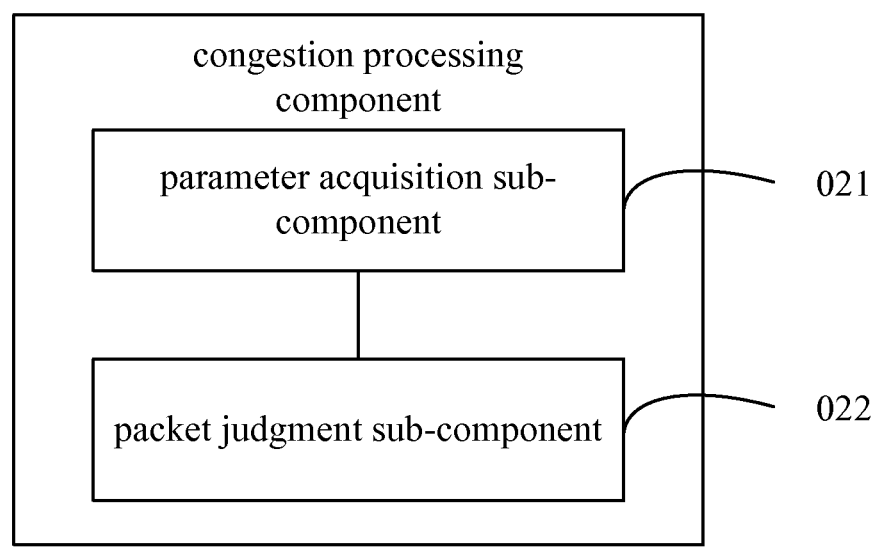
FIG. 8 is a structural diagram of the congestion processing component contained in the device for processing the packet congestion according to an embodiment of the disclosure.

Refer to FIG. 8, which is structural diagram of the congestion processing component in the device for processing the packet congestion according to an embodiment of the disclosure, only the congestion processing component 02 is described in detail while the other components involved in the device for processing the packet congestion herein are understood with reference to related detailed description given in related embodiments and are therefore not described here repeatedly.

As shown in FIG. 8, in the device for processing the packet congestion in the disclosure, the congestion processing component 02 specifically includes:

a parameter acquisition sub-component 021 is configured to:

acquire the average queue size of the packet according to the fragment parameters and the congestion parameters, acquire a WRED policy group according to a packet queue number contained in the fragment parameters, and acquire the upper size threshold and the lower size threshold of the average queue size according to the queue priority and policy group parameters contained in the WRED policy group;

the parameter acquisition sub-component 021 calculates a queue size by the configured packet size if the packet fragment is merely the SOP fragment, and then calculates an average queue size corresponding to the current packet according to the queue size, a queue calculation weight and the average queue size of the packet fragments; in an example embodiment, the parameter acquisition sub-component 021 carries out processing the packet congestion with a WRED algorithm; the working principle of WRED can be understood with reference to the detailed description given in the embodiment shown in FIG. 4 and is therefore not described here repeatedly; the parameter acquisition sub-component 021 acquires a WRED policy group according to a packet queue number received and acquires policy group parameters according to the policy group, wherein the policy group parameters include a queue calculation weight and queue size thresholds; the parameter acquisition sub-component 021 acquires parameters required for processing the current packet congestion, such as the upper size threshold of the average queue size, the lower size threshold of the average queue size and the discharging slope of curve, from a corresponding internal RAM according to the WRED policy group and a packet priority; and a packet judgment sub-component 022 is configured to:

judge the relationship between the average queue size and the upper size threshold as well as between the average queue size and the lower size threshold;

the packet judgment sub-component 022 permits the discarding of the SOP fragment if the average queue size is greater than the upper size threshold, permits the passing of the SOP fragment if the average queue size is less than the lower size threshold, and randomly discards the SOP fragment according to the WRED policy group if the average queue size is neither less than the lower size threshold nor greater than the upper size threshold; all packet fragments of the packet are passed or discarded according to the result of the processing implemented on the SOP fragment.

The packet judgment sub-component 022 judges the relationship between the average queue size and the upper size threshold as well as the relationship between the average queue size and the lower size threshold, permits the discarding of the SOP fragment if the average queue size is greater than the upper size threshold, permits the passing of the SOP fragment if the average queue size is less than the lower size threshold, and randomly discards the SOP fragment according to the WRED policy group if the average queue size is neither less than the lower size threshold nor greater than the upper size threshold.

In an example embodiment, the process that the packet judgment sub-component 022 randomly discards the SOP fragment according to the WRED policy group specifically includes: the packet judgment sub-component 022 generates a random number, calculates and acquires the discarding probability of the SOP fragment according to the WRED policy group, and permits the discarding of the SOP fragment if the random number is less than the discarding probability or permits the passing of the SOP fragment if the random number is not less than the discarding probability; the packet judgment sub-component 022 processes all the packet fragments in the packet according to the result of the processing implemented on the SOP fragment: the packet judgment sub-component 022 discards all subsequent fragments of the packet if it is determined to discard the SOP fragment or permits the passing of all the following fragments of the packet if it is determined to pass the SOP fragment.

In the embodiment, by acquiring the average queue size of an SOP fragment according to fragment parameters and congestion parameters and processing a packet according to the average queue size, the device effectively eliminates the packet congestion in the communication network and saves the internal cache space.

Figure 9:
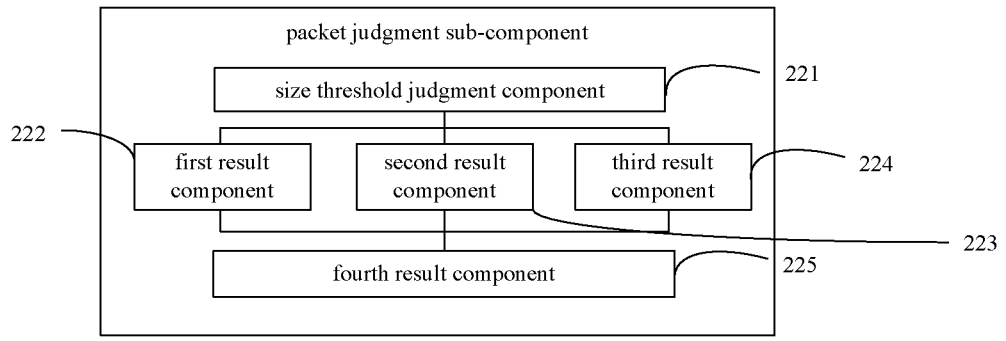
FIG. 9 is a structural diagram of the packet judgment sub-component contained in the device for processing the packet congestion according to an embodiment of the disclosure.

Refer to FIG. 9, which is a structural diagram of the packet judgment sub-component contained in the device for processing the packet congestion according to an embodiment of the disclosure, only the packet judgment sub-component 022 is described in detail while the other components contained in the device for processing the packet congestion herein are understood with reference to related detailed description given in related embodiments and are therefore not described here repeatedly.

As shown in FIG. 9, in the device for processing the packet congestion herein, the packet judgment sub-component 022 includes:

a size threshold judgment component 221 is configured to judge the relationship between the average queue size and the upper size threshold as well as the relationship between the average queue size and the lower size threshold;

a first result component 222 is configured to permit the discarding of the SOP fragment when the average queue size is greater than the upper size threshold;

a second result component 223 is configured to permit the passing of the SOP fragment when the average queue size is less than the lower size threshold;

a third result component 224 is configured to randomly discard the SOP fragment according to the WRED policy group when the average queue size is neither less than the lower size threshold nor greater than the upper size threshold; and a fourth result component 225 is configured to permit the passing or discarding of all packet fragments of the packet according to the result of the processing implemented on the SOP fragment.

Figure 10:
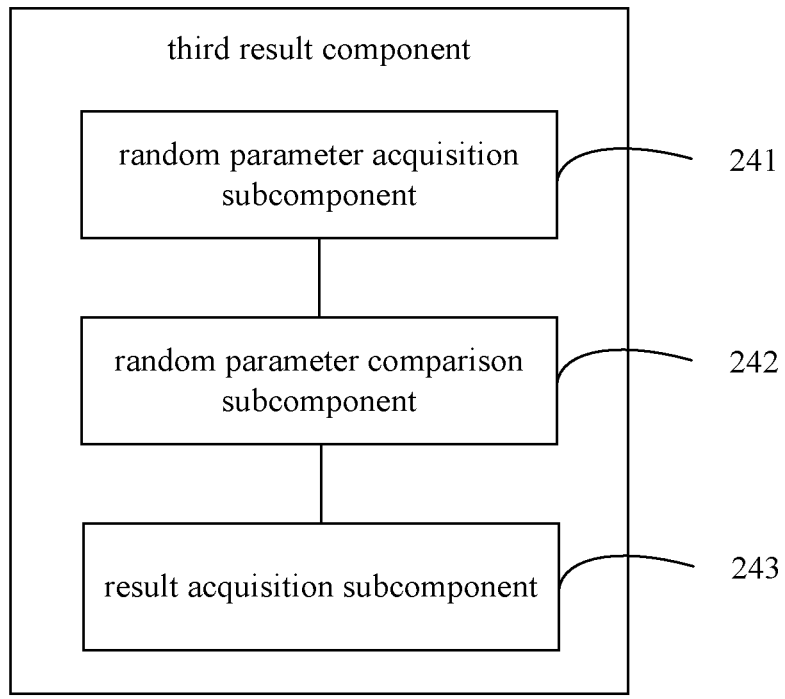
FIG. 10 is a structural diagram of the third result component contained in the device for processing the packet congestion according to an embodiment of the disclosure.

Refer to FIG. 10, which is a structural diagram of the third result component contained in the device for processing the packet congestion according to an embodiment of the disclosure, the third result component 224 specifically includes:

a random parameter acquisition subcomponent 241 is configured to generate a random number, and calculate and acquire the discarding probability of the SOP fragment according to the WRED policy group;

the random parameter acquisition subcomponent 241 generates a random number R before randomly discarding the SOP fragment and calculates a discarding probability Pb according to a WRED algorithm which can be understood with reference to related detailed description given in the embodiment shown in FIG. 4 and is therefore not described here repeatedly;

a random parameter comparison subcomponent 242 is configured to judge whether or not the random number is less than the discarding probability; and a result acquisition subcomponent 243 is configured to permit the discarding of the SOP fragment if the random number is less than the discarding probability or permit the passing of the SOP fragment if the random number is not less than the discarding probability.

The result acquisition subcomponent 243 randomly discards the SOP fragment as the random parameter comparison subcomponent 242 performs an arbitration determination on the random number R and the discarding probability Pb, specifically, if the random parameter comparison subcomponent 242 judges that the random number R being less than the discarding probability Pb is met, then the result acquisition subcomponent 243 permits the SOP fragment to be discarded; if the random parameter comparison subcomponent 242 judges that the random number R being less than the discarding probability Pb is not met, then the result acquisition subcomponent 243 permits the SOP fragment not to be discarded. The packet is permitted to be discarded if the result acquisition subcomponent 243 permits the SOP fragment to be discarded; or the packet is permitted not to be discarded if the result acquisition subcomponent 243 permits the SOP fragment not to be discarded.

In the embodiment, by generating the random number, calculating and acquiring the discarding probability according to the WRED policy group and randomly discarding the packet according to the relationship between the random number and the discarding probability, the device further improves the efficiency of the congestion processing.

Figure 11:
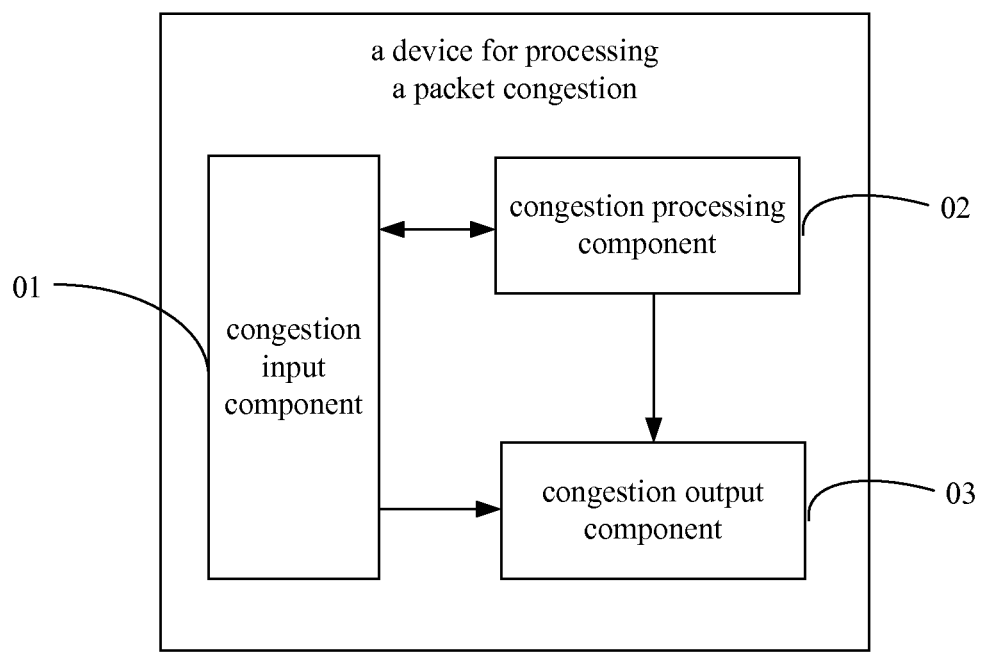
FIG. 11 is a structural diagram of a device for processing the packet congestion according to the second embodiment of the disclosure.

Refer to FIG. 11, which is a structural diagram of a device for processing the packet congestion according to the second embodiment of the disclosure; the second embodiment is merely different from the first embodiment in the addition of a congestion output component 03, in the second embodiment, only the congestion output component 03 is described in detail while the other components contained in the device for processing the packet congestion herein are understood with reference to related detailed description given in related embodiments and are therefore not described here repeatedly.

As shown in FIG. 11, the device for processing the packet congestion in the disclosure herein further includes:

a congestion output component 03 is configured to discard the packet permitted to be discarded or transmit the packet permitted to be passed and the updated average queue size of the packet according to the result of the processing implemented on the packet.

The congestion output component 03 is responsible for receiving a packet processed by the congestion processing component 02 and directly discarding a packet needing discarding and sending a normal packet to a lower-level component for a further processing according to the result of a discarding judgment. Meanwhile, the congestion output component 03 transmits the updated average queue size of the packet to a related component to update the average queue size stored in the RAM.

In the embodiment, by processing the packet according to a packet processing result and transmitting the updated average queue size of the packet, the method further accelerates the operation speed of processing the packet congestion and saves the internal cache space.

Above description is only to illustrate the example embodiments but not to limit the scope of the disclosure; and the direct or indirect application of any equivalent structure or equivalent flow devised as defined by the description and accompanying drawings of the disclosure to other related fields should also fall within the protection scope of the disclosure.

What is claimed is:

1. A method for processing packet congestion, comprising:
   receiving packet fragments of a packet and fragment parameters and acquiring congestion parameters required for processing packet congestion according to the fragment parameters; and
   when a packet fragment is a Start Of Packet, SOP, fragment in the packet, acquiring an average queue size and a size threshold of the packet fragments of the packet according to the fragment parameters and the congestion parameters and processing the packet.

2. The method according to claim 1, wherein after acquiring the average queue size and the size threshold of the packet according to the fragment parameters and the congestion parameters, the method further comprises:
   correcting and updating the average queue size of the packet according to the difference between an actual size of the packet and a configured packet size contained in the fragment parameters when an End Of Packet, EOP, fragment of the packet arrives, wherein the actual size of the packet refers to total queue size, the configured packet size refers to the packet fragment size.

3. The method according to claim 1, wherein acquiring the average queue size and the size threshold of the packet according to the fragment parameters and the congestion parameters and processing the packet comprises:
   acquiring the average queue size of the packet according to the fragment parameters and the congestion parameters;
   acquiring a Weighted Random Early Detection, WRED, policy group according to a packet queue number contained in the fragment parameters and acquiring an upper size threshold and a lower size threshold of the average queue size according to queue priority and policy group parameters contained in the WRED policy group;
   judging a relationship between the average queue size and the upper size threshold as well as a relationship between the average queue size and the lower size threshold;
   permitting discarding of the SOP fragment if the average queue size is greater than the upper size threshold;
   permitting passing of the SOP fragment if the average queue size is less than the lower size threshold;
   randomly discarding the SOP fragment according to the WRED policy group if the average queue size is neither less than the lower size threshold nor greater than the upper size threshold; and
   permitting the passing or discarding of all packet fragments of the packet according to the result of the processing implemented on the SOP fragment.

4. The method according to claim 3, wherein randomly discarding the SOP fragment according to the WRED policy group if the average queue size is neither less than the lower size threshold nor greater than the upper size threshold comprises:
   generating a random number, and calculating and acquiring a discarding probability of the SOP fragment according to the WRED policy group;
   judging whether or not the random number is less than the discarding probability;
   permitting the discarding of the SOP fragment if the random number is less than the discarding probability; or
   permitting the passing of the SOP fragment if the random number is not less than the discarding probability.

5. The method according to claim 1, wherein after correcting and updating the average queue size of the packet according to the difference between the actual size of the packet and the configured packet size contained in the fragment parameters when the EOP fragment arrives, the method further comprises:
   discarding the packet permitted to be discarded or transmitting the packet permitted to be passed and the updated average queue size of the packet according to the result of the processing implemented on the packet.

6. A device for processing packet congestion, comprising:
   a congestion input component, coupled with a congestion processing component, and configured to receive packet fragments of a packet and fragment parameters and acquire congestion parameters required for processing packet congestion according to the fragment parameters; and
   the congestion processing component, coupled with the congestion input component, and configured to acquire, when the packet fragment is the a Start Of Packet, SOP, fragment in the packet, the average queue size and a size threshold of the packet fragments of the packet according to the fragment parameters and the congestion parameters and process the packet.

7. The device according to claim 6, wherein the congestion processing component, coupled with the congestion input component, is further configured to correct and update the average queue size of the packet according to the difference between an actual size of the packet and a configured packet size contained in the fragment parameters when an End Of Packet, EOP, fragment of the packet arrives, wherein the actual size of the packet refers to total queue size, the configured packet size refers to the packet fragment size.

8. The device according to claim 6, wherein the congestion processing component comprises:
   a parameter acquisition sub-component, coupled with a packet judgment sub-component, and configured to:
   acquire the average queue size of the packet according to the fragment parameters and the congestion parameters,
   acquire a Weighted Random Early Detection, WRED, policy group according to a packet queue number contained in the fragment parameters and acquire an upper size threshold and a lower size threshold of the average queue size according to the queue priority and policy group parameters contained in the WRED policy group;
   the packet judgment sub-component, coupled with the packet judgment sub-component, and configured to:
   judge a relationship between the average queue size and the upper size threshold as well as a relationship between the average queue size and the lower size threshold;
   permit the discarding of the SOP fragment if the average queue size is greater than the upper size threshold;
   permit the passing of the SOP fragment if the average queue size is less than the lower size threshold;
   randomly discard the SOP fragment according to the WRED policy group if the average queue size is neither less than the lower size threshold nor greater than the upper size threshold; and
   permit the passing or discarding of all packet fragments of the packet according to the result of the processing implemented on the SOP fragment.

9. The device according to claim 8, wherein the packet judgment sub-component comprises:
   a size threshold judgment component, coupled with a first result component, a second result component, a third result component, and configured to judge the relationship between the average queue size and the upper size threshold as well as the relationship between the average queue size and the lower size threshold;
   the first result component, coupled with the size threshold judgment component, and configured to permit the discarding of the SOP fragment when the average queue size is greater than the upper size threshold;
   the second result component, coupled with the size threshold judgment component, and configured to permit the passing of the SOP fragment when the average queue size is less than the lower size threshold;
   the third result component, coupled with the size threshold judgment component, and configured to randomly discard the SOP fragment according to the WRED policy group when the average queue size is neither less than the lower size threshold nor greater than the upper size threshold, and a fourth result component, coupled with the first result component, the second result component, the third result component, and configured to permit the passing or discarding of all packet fragments of the packet according to the result of the processing implemented on the SOP fragment, wherein the third result component comprises:

a random parameter acquisition subcomponent, coupled with a random parameter comparison subcomponent, and configured to generate a random number and calculate and acquire the discarding probability of the SOP fragment according to the WRED policy group;

the random parameter comparison subcomponent, coupled with a result acquisition subcomponent, and configured to judge whether or not the random number is less than the discarding probability; and the result acquisition subcomponent, coupled with the random parameter comparison, and configured to permit the discarding of the SOP fragment when the random number is less than the discarding probability or to permit the passing of the SOP fragment when the random number is not less than the discarding probability of the SOP fragment.

10. The device according to claim 6, wherein the device further comprises:

a congestion output component, coupled with the congestion input component, congestion processing component, and configured to discard the packet permitted to be discarded or transmit the packet permitted to be passed and the updated average queue size of the packet according to the result of the processing implemented on the packet.

11. The method according to claim 2, wherein acquiring the average queue size and the size threshold of the packet according to the fragment parameters and the congestion parameters and processing the packet comprises:

acquiring the average queue size of the packet according to the fragment parameters and the congestion parameters;

acquiring a Weighted Random Early Detection, WRED, policy group according to a packet queue number contained in the fragment parameters and acquiring an upper size threshold and a lower size threshold of the average queue size according to queue priority and policy group parameters contained in the WRED policy group;

judging a relationship between the average queue size and the upper size threshold as well as a relationship between the average queue size and the lower size threshold;

permitting discarding of the SOP fragment if the average queue size is greater than the upper size threshold;

permitting passing of the SOP fragment if the average queue size is less than the lower size threshold;

randomly discarding the SOP fragment according to the WRED policy group if the average queue size is neither less than the lower size threshold nor greater than the upper size threshold; and permitting the passing or discarding of all packet fragments of the packet according to the result of the processing implemented on the SOP fragment.

12. The method according to claim 11, wherein randomly discarding the SOP fragment according to the WRED policy group if the average queue size is neither less than the lower size threshold nor greater than the upper size threshold comprises:

generating a random number, and calculating and acquiring a discarding probability of the SOP fragment according to the WRED policy group;

judging whether or not the random number is less than the discarding probability;

permitting the discarding of the SOP fragment if the random number is less than the discarding probability; or permitting the passing of the SOP fragment if the random number is not less than the discarding probability.

13. The method according to claim 2, wherein after correcting and updating the average queue size of the packet according to the difference between the actual size of the packet and the configured packet size contained in the fragment parameters when the EOP fragment arrives, the method further comprises:

discarding the packet permitted to be discarded or transmitting the packet permitted to be passed and the updated average queue size of the packet according to the result of the processing implemented on the packet.

14. The device according to claim 7, wherein the congestion processing component comprises:

a parameter acquisition sub-component, coupled with a packet judgment sub-component, and configured to:

acquire the average queue size of the packet according to the fragment parameters and the congestion parameters, acquire a Weighted Random Early Detection, WRED, policy group according to a packet queue number contained in the fragment parameters and acquire an upper size threshold and a lower size threshold of the average queue size according to the queue priority and policy group parameters contained in the WRED policy group;

the packet judgment sub-component, coupled with the packet judgment sub-component, and configured to:

judge a relationship between the average queue size and the upper size threshold as well as a relationship between the average queue size and the lower size threshold;

permit the discarding of the SOP fragment if the average queue size is greater than the upper size threshold;

permit the passing of the SOP fragment if the average queue size is less than the lower size threshold;

randomly discard the SOP fragment according to the WRED policy group if the average queue size is neither less than the lower size threshold nor greater than the upper size threshold; and permit the passing or discarding of all packet fragments of the packet according to the result of the processing implemented on the SOP fragment.

15. The device according to claim 14, wherein the packet judgment sub-component comprises:

a size threshold judgment component, coupled with a first result component, a second result component, a third result component, and configured to judge the relationship between the average queue size and the upper size threshold as well as the relationship between the average queue size and the lower size threshold;

the first result component, coupled with the size threshold judgment component, and configured to permit the discarding of the SOP fragment when the average queue size is greater than the upper size threshold;

the second result component, coupled with the size threshold judgment component, and configured to permit the passing of the SOP fragment when the average queue size is less than the lower size threshold;

the third result component, coupled with the size threshold judgment component, and configured to randomly discard the SOP fragment according to the WRED policy group when the average queue size is neither less than the lower size threshold nor greater than the upper size threshold, and a fourth result component, coupled with the first result component, the second result component, the third result component, and configured to permit the passing or discarding of all packet fragments of the packet according to the result of the processing implemented on the SOP fragment, wherein the third result component comprises:

a random parameter acquisition subcomponent, coupled with a random parameter comparison subcomponent, and configured to generate a random number and calculate and acquire the discarding probability of the SOP fragment according to the WRED policy group;

the random parameter comparison subcomponent, coupled with a result acquisition subcomponent, and configured to judge whether or not the random number is less than the discarding probability; and the result acquisition subcomponent, coupled with the random parameter comparison, and configured to permit the discarding of the SOP fragment when the random number is less than the discarding probability or to permit the passing of the SOP fragment when the random number is not less than the discarding probability of the SOP fragment.

16. The device according to claim 7, wherein the device further comprises:

a congestion output component, coupled with the congestion input component, congestion processing component, and configured to discard the packet permitted to be discarded or transmit the packet permitted to be passed and the updated average queue size of the packet according to the result of the processing implemented on the packet.

\* \* \* \* \*